United States Patent
Goto et al.

(10) Patent No.: US 7,273,136 B2
(45) Date of Patent: Sep. 25, 2007

(54) PARKING BRAKE DEVICE OF VEHICLE

(75) Inventors: Tetsuya Goto, Kariya (JP); Keinosuke Ichikawa, Nagano-ken (JP); Yasuhiro Maeda, Nagano-ken (JP); Hiroyuki Horiuchi, Nagano-ken (JP)

(73) Assignees: Kabushiki Kaisha Toyota Jidoshokki, Kariya-shi (JP); Nishina Industrial Co., Ltd., Nagano-ken (JP)

( * ) Notice: Subject to any disclaimer, the term of this patent is extended or adjusted under 35 U.S.C. 154(b) by 11 days.

(21) Appl. No.: 11/009,332

(22) Filed: Dec. 10, 2004

(65) Prior Publication Data
US 2005/0127748 A1    Jun. 16, 2005

(30) Foreign Application Priority Data
Dec. 11, 2003    (JP)    ............ 2003-413451

(51) Int. Cl.
*F16D 65/24*    (2006.01)
*B60T 13/22*    (2006.01)

(52) U.S. Cl. .......... 188/170; 188/265; 303/71; 303/73; 303/89

(58) Field of Classification Search ....... 188/166, 188/170, 265; 303/10, 11, 89, 3, 71, 72, 303/73, 74; 177/170, 166
See application file for complete search history.

(56) References Cited

U.S. PATENT DOCUMENTS

| | | | | |
|---|---|---|---|---|
| 3,724,609 A | * | 4/1973 | Kobald | ............ 188/170 |
| 3,802,746 A | * | 4/1974 | Walser | ............ 188/170 |
| 5,601,160 A | * | 2/1997 | Horsch | ............ 188/170 |
| 5,648,644 A | * | 7/1997 | Nagel | ............ 187/288 |
| 5,779,325 A | * | 7/1998 | Diesel | ............ 188/170 |
| 6,105,738 A | * | 8/2000 | Christen | ............ 188/170 |
| 2003/0090148 A1 | | 5/2003 | Eliasson | ............ 303/122.09 |
| 2005/0279593 A1 | * | 12/2005 | Uphues | ............ 188/170 |

FOREIGN PATENT DOCUMENTS

| | | |
|---|---|---|
| GB | 1 217 747 | 12/1970 |
| JP | 46-045267 | 1/1973 |

(Continued)

OTHER PUBLICATIONS

Hideaki Shima, "Development of the Wet Disc Brake System for Battery Fork Lift Truck", Toyota Technical Review No. 46, Jan. 2003 pp. 18-21.

*Primary Examiner*—Thomas Williams
(74) *Attorney, Agent, or Firm*—Morgan & Finnegan, L.L.P.

(57) ABSTRACT

A hydraulic parking brake device is selectively switched between a braking state and a non-braking state. A braking force decreases as a pressure in the control oil chamber increases and increases as the pressure in the control oil chamber decreases. The device includes a discharged oil restrictor located in a discharge passage and an accumulator connected to the control oil chamber. The accumulator is capable of releasing hydraulic oil to the control oil chamber when the braking force is greater than that at the time when the parking brake device is switched from the non-braking state to the braking state and the braking force can further be increased during the braking state of the parking brake device. Thus, the parking brake device can gradually brake the vehicle from the running state.

14 Claims, 2 Drawing Sheets

FOREIGN PATENT DOCUMENTS

| | | |
|---|---|---|
| JP | 51-123480 | 10/1976 |
| JP | 59-145445 | 9/1984 |
| JP | 61-3164 | 1/1986 |
| JP | 62-194172 | 12/1987 |
| JP | 63-111361 | 7/1988 |
| JP | 5-44739 | 6/1993 |
| WO | WO 2003080413 A1 * | 12/2003 |

* cited by examiner

PARKING BRAKE DEVICE OF VEHICLE

BACKGROUND OF THE INVENTION

The present invention relates to a parking brake device used in a vehicle such as a forklift.

For example, a forklift includes a parking brake device used when parking the forklift besides a service brake device used for controlling the speed or stopping the forklift during traveling. Such a parking brake device is disclosed in, for example, Toyota Jidoshokki Technical Review No. 46, January 2003, on page 18-21.

As shown in FIG. 4, the forklift is provided with a braking portion 101 of a parking brake device in the vicinity of a drive motor 102. The braking portion 101 includes a brake disk 103, which rotates integrally with an output shaft 102a of the drive motor 102, and a piston 104, which has a brake pad 104a. The brake pad 104a moves relative to the brake disk 103 in the axial direction of the output shaft 102a. The braking portion 101 also includes a spring 105, which urges the piston 104 in a direction such that the brake pad 104a approaches the brake disk 103, and a control oil chamber 106, which applies force on the piston 104 in a direction opposite to the force of the spring 105 based on the internal pressure. The control oil chamber 106 is connected to a hydraulic pump 107 and an oil tank 108 via a switching valve 109.

When an occupant manipulates the switching valve 109 such that the control oil chamber 106 is connected to the hydraulic pump 107, hydraulic oil is supplied to the control oil chamber 106 from the hydraulic pump 107. Therefore, the piston 104 moves against the force of the spring 105 reducing the contact force between the brake pad 104a and the brake disk 103. Accordingly, the parking brake device loses a braking force. When the occupant manipulates the switching valve 109 such that the control oil chamber 106 is connected to the oil tank 108 without via the hydraulic pump 107, hydraulic oil in the control oil chamber 106 is discharged to the oil tank 108. Therefore, the piston 104 moves by the force of the spring 105 increasing the contact force between the brake pad 104a and the brake disk 103. Accordingly, the parking brake device exerts a braking force.

Unlike the service brake device, which reflects the intention of the occupant to the level of the braking force, the parking brake device is switched between tow positions, which are a braking state and a non-braking state. Therefore, for example, if the parking brake device is shifted from the non-braking state to the braking state when the forklift is traveling, the maximum value of the absolute value of deceleration (so called "braking G-force") might be increased.

SUMMARY OF THE INVENTION

Accordingly, it is an objective of the present invention to provide a parking brake device that can gradually brake a vehicle during traveling.

To achieve the above-mentioned objective, the present invention provides a hydraulic parking brake device of a vehicle. The device is selectively switched between a braking state and a non-braking state. The device includes a braking portion, which generates a braking force. The braking portion has a control oil chamber into which hydraulic oil flows. The braking force decreases as the pressure in the control oil chamber increases and increases as the pressure in the control oil chamber decreases. The device includes an oil tank; a hydraulic pump; a supply passage, which connects the hydraulic pump to the control oil chamber in the non-braking state; and a discharge passage, which connects the control oil chamber to the oil tank in the braking state. A discharged oil restrictor is located in the discharge passage. An accumulator is connected to the control oil chamber. The accumulator is capable of releasing hydraulic oil to the control oil chamber when the braking force is greater than that at the time when the parking brake device is switched from the non-braking state to the braking state and the braking force can further be increased during the braking state of the parking brake device.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be described.

Figure 1:
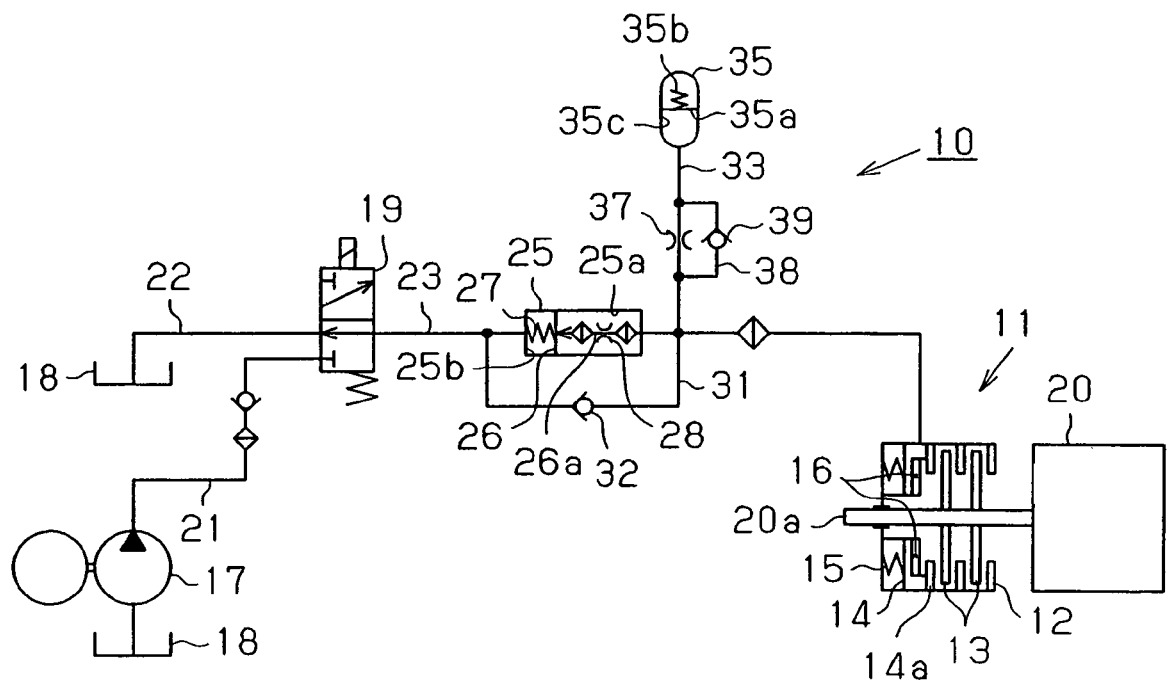
FIG. 1 is a hydraulic circuit diagram illustrating a parking brake device according to one embodiment of the present invention.

FIG. 1 shows a hydraulic circuit of a parking brake device 10 used in industrial vehicles such as a forklift. The forklift has a drive motor 20 and a braking portion 11, which is located in the vicinity of the drive motor 20. The braking portion 11 has a housing 12, which accommodates a brake disk 13 and a piston 14. The brake disk 13 rotates integrally with an output shaft 20a of the drive motor 20. The piston 14 has a brake pad 14a, which moves relative to the brake disk 13 in the axial direction. A spring 15, which urges the piston 14 in a direction such that the brake pad 14a approaches the brake disk 13, and a control oil chamber 16, which applies force on the piston 14 in a direction opposite to the force of the spring 15 based on the internal pressure, are provided in the housing 12 of the braking portion 11.

The control oil chamber 16 of the braking portion 11 is connected to a hydraulic pump 17 and an oil tank 18 via an electromagnetic switching valve 19. The parking brake device 10 shares the hydraulic pump 17 and the oil tank 18 with a service brake device and a power steering device, which are not shown. That is, a supply pipe 21, which extends from the hydraulic pump 17, and a discharge pipe 22, which extends from the oil tank 18 are connected to the switching valve 19. The switching valve 19 is connected to an oil supply/discharge passage 23, which extends from the control oil chamber 16 of the braking portion 11. In this embodiment, the supply pipe 21 and the oil supply/discharge passage 23 form a supply passage, and the discharge pipe 22 and the oil supply/discharge passage 23 form a discharge passage. The discharge passage and the supply passage share the oil supply/discharge passage 23. That is, part of the discharge passage and part of the supply passage forms the common supply/discharge passage 23. Sharing the oil supply/discharge passage 23 simplifies the structure of the hydraulic circuit.

When an electromagnetic actuator is de-excited (the switching valve 19 is switched OFF), the switching valve 19 connects the oil supply/discharge passage 23 to the discharge pipe 22, that is, the switching valve 19 connects the control oil chamber 16 of the braking portion 11 to the oil tank 18 without via the hydraulic pump 17. When an electromagnetic actuator is excited (the switching valve 19 is switched ON), the switching valve 19 connects the oil supply/discharge passage 23 to the supply pipe 21, that is, the switching valve 19 connects the hydraulic pump 17 to the control oil chamber 16 of the braking portion 11.

A piston chamber 25 is defined in the oil supply/discharge passage 23. The piston chamber 25 accommodates a piston 26, which defines a first oil chamber 25a on the side facing the control oil chamber 16 and a second oil chamber 25b on the side facing the switching valve 19. The second oil chamber 25b accommodates a spring 27, which urges the piston 26 toward the first oil chamber 25a. A piston passage 26a is formed in the piston 26 to connect the first oil chamber 25a to the second oil chamber 25b. A discharged oil restrictor 28 is located in the piston passage 26a.

A supplied oil bypass passage 31, which bypasses the piston chamber 25, that is, bypasses the discharged oil restrictor 28, is connected to the oil supply/discharge passage 23. A supplied oil check valve 32, which permits hydraulic oil to flow toward the control oil chamber 16 of the braking portion 11 from the switching valve 19, is located in the supplied oil bypass passage 31. That is, the supplied oil check valve 32 prevents hydraulic oil from flowing toward the switching valve 19 from the control oil chamber 16 through the supplied oil bypass passage 31.

An accumulator 35 is connected to a section of the oil supply/discharge passage 23 between the control oil chamber 16 and the piston chamber 25 (the discharged oil restrictor 28) via a branch passage 33. The branch passage 33 and the section of the oil supply/discharge passage 23 between the control oil chamber 16 and the joint portion with the branch passage 33 form an accumulator passage. The accumulator 35 is spring type. The accumulator 35 accommodates a piston 35a. The piston 35a divides the inside of the accumulator 35 into a space, which accommodates a spring 35b, and a hydraulic chamber 35c. The branch passage 33 is connected to the accumulator 35 at the hydraulic chamber 35c.

An oil accumulation restrictor 37 is located in the branch passage 33. An oil releasing bypass passage 38 for bypassing the oil accumulation restrictor 37 is connected to the branch passage 33 at the front and rear of the oil accumulation restrictor 37. An oil releasing check valve 39, which permits hydraulic oil to flow toward the oil supply/discharge passage 23 from the accumulator 35 (the hydraulic chamber 35c), is located in the oil releasing bypass passage 38. That is, the oil releasing check valve 39 prevents hydraulic oil from flowing toward the accumulator 35 from the oil supply/discharge passage 23. When the occupant switches the switching valve 19 ON, hydraulic oil is supplied to the oil supply/discharge passage 23 from the hydraulic pump 17 via the switching valve 19 (non-braking state of the parking brake device 10). The hydraulic oil supplied to the oil supply/discharge passage 23 is supplied to the control oil chamber 16 of the braking portion 11 mainly via the supplied oil bypass passage 31. Therefore, the piston 14 moves against the force of the spring 15 reducing the contact force between the brake pad 14a and the brake disk 13. Accordingly, the parking brake device 10 loses braking force.

When the parking brake device 10 is in the non-braking state, hydraulic oil is supplied to the accumulator 35 (hydraulic chamber 35c) from the hydraulic pump 17 via the oil supply/discharge passage 23 and the branch passage 33 (the oil accumulation restrictor 37). Therefore, in the accumulator 35, the piston 35a moves against the force of the spring 35b to expand the hydraulic chamber 35c. The hydraulic oil is introduced into the hydraulic chamber 35c and accumulated therein. When the hydraulic pressure in the hydraulic chamber 35c achieves the maximum accumulation value, the accumulator 35 stops expanding the hydraulic chamber 35c and the introduction of hydraulic oil into the hydraulic chamber 35c is stopped. The accumulator 35 therefore becomes incapable of accumulating more hydraulic oil. The maximum accumulation value of the accumulator 35 is set to a value far lower than the maximum pressure of the control oil chamber 16 of the braking portion 11 during the non-braking state of the parking brake device 10 (the setting will be described later).

When the parking brake device 10 is in the non-braking state, hydraulic oil is supplied to the second oil chamber 25b of the piston chamber 25 from the hydraulic pump 17. Since the piston passage 26a, which connects the second oil chamber 25b to the first oil chamber 25a, is restricted by the discharged oil restrictor 28, the pressure in the second oil chamber 25b becomes greater than the pressure in the first oil chamber 25a. The increased pressure in the second oil chamber 25b and the force of the spring 27, which urges the piston 26 toward the first oil chamber 25a, cause the piston 26 to move toward the first oil chamber 25a, thereby minimizing the volume of the first oil chamber 25a.

When the occupant switches the switching valve 19 OFF, the oil supply/discharge passage 23 is connected to the oil tank 18 via the switching valve 19 and the discharge pipe 22 without via the hydraulic pump 17 (braking state of the parking brake device 10). Therefore, the hydraulic oil in the control oil chamber 16 of the braking portion 11 is discharged to the oil tank 18 via the switching valve 19 and the discharge pipe 22 while being restricted by the discharged oil restrictor 28.

Figure 2:
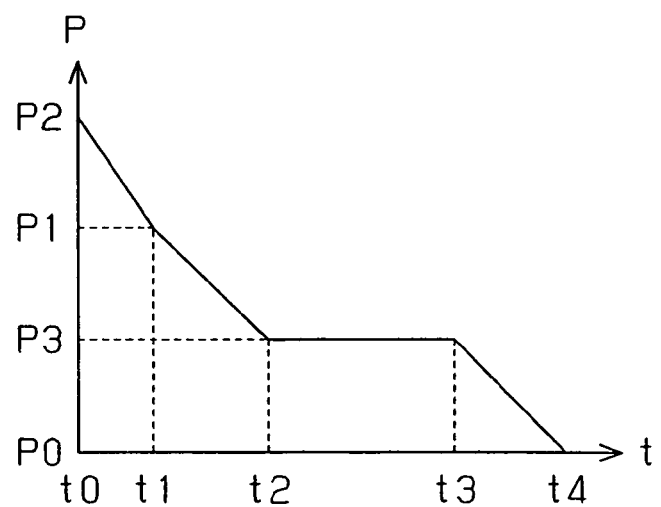
FIG. 2 is a graph showing pressure changes over time in a control oil chamber of a braking portion incorporated in the device of FIG. 1.

FIG. 2 is a graph showing pressure changes over time in the control oil chamber 16 of the braking portion 11. The time t0 at which the switching valve 19 is switched OFF, that is, the time t0 at which the parking brake device 10 is switched from the non-braking state to the braking state is set to the origin of the graph. As shown in FIG. 2, the pressure P1 in the control oil chamber 16 at the time t1 at which the braking portion 11 exerts braking force is lower than the pressure P2 in the control oil chamber 16 at the time t0 at which the parking brake device 10 is switched from the non-braking state to the braking state. This is because the braking portion 11 has a no reaction region of the braking force from when the parking brake device 10 is switched from the non-braking state to the braking state until when the brake pad 14a contacts the brake disk 13.

When the parking brake device 10 is switched from the non-braking state to the braking state, hydraulic oil is supplied to the first oil chamber 25a of the piston chamber 25 from the control oil chamber 16 of the braking portion 11. Since the piston passage 26a is restricted by the discharged oil restrictor 28, the pressure in the first oil chamber 25a becomes greater than the pressure in the second oil chamber 25b. Therefore, the piston 26 moves toward the second oil chamber 25b against the force of the spring 27 and the force based on the pressure in the second oil chamber 25b to increase the volume of the first oil chamber 25a from the minimum volume. Therefore, the hydraulic oil in the control oil chamber 16 of the braking portion 11 is promptly discharged and the pressure in the control oil chamber 16 is quickly decreased.

The maximum volume of the first oil chamber 25a is slightly less than the maximum volume of the control oil chamber 16 of the braking portion 11. That is, increasing the volume of the first oil chamber 25a promotes discharging of the hydraulic oil from the control oil chamber 16 until immediately before the brake pad 14a contacts the brake disk 13, that is, immediately before braking force is exerted. With this structure, exertion of braking force is prevented from being delayed.

At the time t2, which is after the time t1 at which the volume of the first oil chamber 25a is maximized, the hydraulic oil in the hydraulic chamber 35c of the accumulator 35 is released to the section of the oil supply/discharge passage 23 between to the control oil chamber 16 and the discharged oil restrictor 28 via the oil releasing bypass passage 38 (the oil releasing check valve 39). Therefore, hardly any hydraulic oil is discharged from the control oil chamber 16 until the time t3 at which the volume of the hydraulic chamber 35c is minimized and the accumulator 35 completes releasing the oil. Accordingly, the pressure in the control oil chamber 16 is maintained to be substantially constant. Thus, the contact force between the brake disk 13 and the brake pad 14a is maintained constant and the braking force exerted by the braking portion 11 is maintained to be substantially constant.

That is, in the preferred embodiment, the accumulator 35 is designed to release oil at a time when the braking force is greater than that at the time t0, at which the parking brake device 10 is switched from the non-braking state to the braking state, and the braking force can further be increased during the braking state of the parking brake device 10. More specifically, the maximum accumulation value P3 of the accumulator 35 is set to a value less than or equal to the pressure P1 in the control oil chamber 16 at the time t1 at which the braking force starts increasing from when the parking brake device 10 is switched from the non-braking state to the braking state. In other words, the braking force starts to increase when the pressure in the control oil chamber 16 is decreased to a predetermined value (pressure P1) after the parking brake device is switched from the non-braking state to the braking state. The maximum accumulation value P3 of the accumulator 35 is set to a value less than or equal to the predetermined value (pressure P1).

After the time t3, at which the accumulator 35 completes releasing oil, discharging of the hydraulic oil from the control oil chamber 16 of the braking portion 11 is substantially resumed, and the pressure in the control oil chamber 16 is decreased to the pressure in the oil tank 18, that is, the tank pressure P0. After the time t4 at which the pressure in the control oil chamber 16 is equalized with the tank pressure P0, the brake pad 14a abuts against the brake disk 13 with the maximum force exerted by the force of the spring 15. Accordingly, the braking force exerted by the braking portion 11 is maximized.

In other words, when the parking brake device 10 is switched from the non-braking state to the braking state, the pressure P in the control oil chamber 16 decreases from P2 to the tank pressure P0. The pressure decrease in the control oil chamber 16 increases the braking force to the predetermined upper limit value (the braking force value corresponding to the tank pressure P0), that is, the maximum force exerted by the spring 15. The accumulator 35 releases hydraulic oil to the control oil chamber 16 during a process of increasing the braking force to the upper limit value. That is, the accumulator 35 releases hydraulic oil to the control oil chamber 16 when the braking force is less than the upper limit value.

The preferred embodiment has the following advantages.

(1) When the parking brake device 10 is in the braking state, the accumulator 35 and the discharged oil restrictor 28 cooperates, until the accumulator 35 completes releasing oil, to maintain the braking force that is greater than that at the time t0, at which the parking brake device 10 is switched from the non-braking state, and not the maximum. Therefore, for example, when the parking brake device 10 is switched from the non-braking state to the braking state while the vehicle is traveling, the braking force is prevented from abruptly and excessively increasing and the maximum value of the absolute value of deceleration is decreased. Thus, the parking brake device 10 gradually brakes the vehicle from the running state.

(2) The oil accumulation restrictor 37 is located in the branch passage 33 connected to the accumulator 35. Therefore, when the parking brake device 10 is switched from the braking state to the non-braking state, the hydraulic oil supplied from the hydraulic pump 17 to the accumulator 35 is restricted by the oil accumulation restrictor 37. Thus, the pressure in the control oil chamber 16 is promptly increased thereby preventing the parking brake device 10 from being released with a delay.

(3) The accumulator 35 and the oil supply/discharge passage 23 are connected to each other by the oil releasing bypass passage 38, which bypasses the oil accumulation restrictor 37. The oil releasing check valve 39, which permits hydraulic oil to flow toward the oil supply/discharge passage 23 from the accumulator 35, is located in the oil releasing bypass passage 38. Therefore, the hydraulic oil in the accumulator 35 is mainly supplied to the control oil chamber 16 via the oil releasing bypass passage 38, which is opened by the oil releasing check valve 39, bypassing the oil accumulation restrictor 37. Thus, releasing of oil by the accumulator 35 is prevented from being hindered by the oil accumulation restrictor 37. This reliably prevents the braking force from abruptly and excessively increasing.

(4) The supplied oil bypass passage 31, which bypasses the discharged oil restrictor 28, is connected to the oil supply/discharge passage 23. The supplied oil check valve 32, which permits hydraulic oil to flow toward the control oil chamber 16 from the switching valve 19, is located in the supplied oil bypass passage 31. Therefore, when the parking brake device 10 is switched from the braking state to the non-braking state, the hydraulic oil in the hydraulic pump 17 is mainly supplied to the control oil chamber 16 via the supplied oil bypass passage 31, which is opened by the supplied oil check valve 32, bypassing the discharged oil restrictor 28. Thus, the pressure in the control oil chamber 16 is promptly increased and the braking force is quickly decreased. This prevents the parking brake device 10 from being released with a delay.

The invention may be embodied in the following forms.

Figure 3:
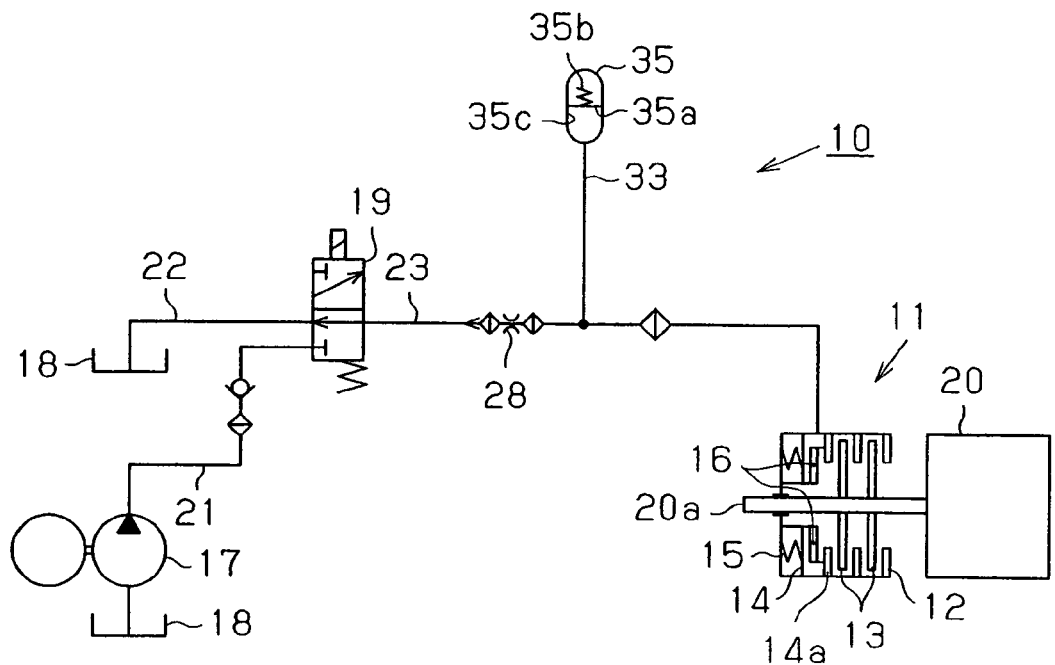
FIG. 3 is a hydraulic circuit diagram illustrating a parking brake device according to a modified embodiment of the present invention.
Figure 4:
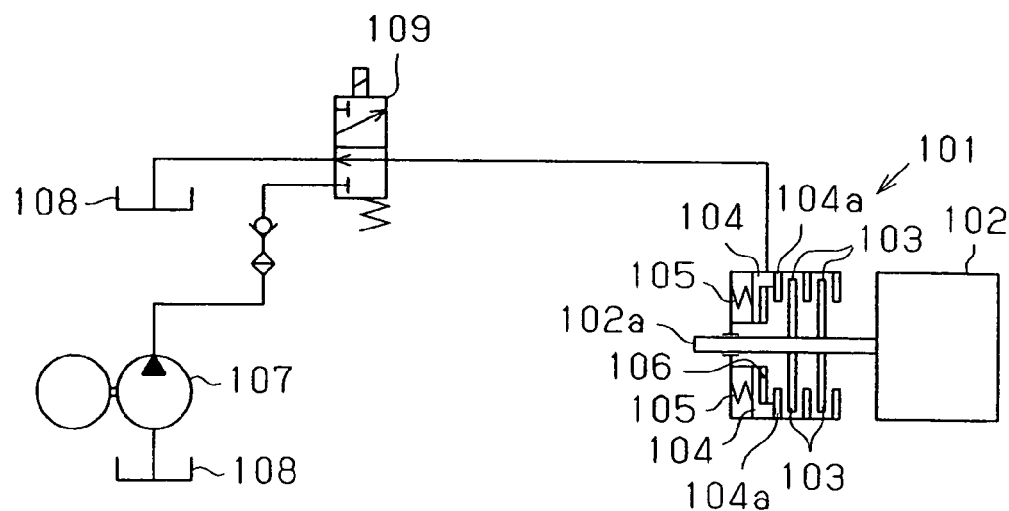
FIG. 4 is a hydraulic circuit diagram illustrating a prior art parking brake device.

As shown in FIG. 3, in the above embodiment, the piston chamber 25 and the structure (such as the piston 26) in the piston chamber 25 may be eliminated and the discharged oil restrictor 28 may be directly located in the oil supply/discharge passage 23. The supplied oil bypass passage 31, the supplied oil check valve 32, the oil accumulation restrictor 37, the oil releasing bypass passage 38, and the oil releasing check valve 39 may be eliminated.

In the above embodiment, the accumulator 35 is spring type. However, the accumulator 35 may be bladder type, diaphragm type, rubber tube type, or piston type.

In the above embodiment, the present invention is embodied in the parking brake device 10 used in an industrial vehicle, which is a forklift. However, the parking brake device 10 may be applied to industrial vehicles other than forklifts such as a bucket loader.

The present examples and embodiments are to be considered as illustrative and not restrictive and the invention is not to be limited to the details given herein, but may be modified within the scope and equivalence of the appended claims.

The invention claimed is:

1. A hydraulic parking brake device of a vehicle, wherein the device is selectively switched between a braking state and a non-braking state, the device comprising:
  a braking portion, which generates a braking force, the braking portion having a control oil chamber into which hydraulic oil flows, the braking force decreasing as the pressure in the control oil chamber increases and increasing as the pressure in the control oil chamber decreases;
  an oil tank;
  a hydraulic pump;
  a supply passage, which connects the hydraulic pump to the control oil chamber in the non-braking state;
  a discharge passage, which connects the control oil chamber to the oil tank in the braking state;
  a discharged oil restrictor located in the discharge passage;
  an accumulator connected to the control oil chamber, the accumulator being capable of releasing hydraulic oil to the control oil chamber when the braking force is greater than that at the time when the parking brake device is switched from the non-braking state to the braking state and the braking force can further be increased during the braking state of the parking brake device;
  an accumulator passage, which connects the accumulator to the control oil chamber;
  an oil accumulation restrictor located in the accumulator passage;
  an oil releasing bypass passage, which connects the accumulator to the control oil chamber bypassing the oil accumulation restrictor; and
  an oil releasing check valve located in the oil releasing bypass passage, wherein the oil releasing check valve permits flow of hydraulic oil from the accumulator to the control oil chamber.

2. The parking brake device according to claim 1, further comprising an urging member, which generates an urging force to increase the braking force, wherein force based on the pressure of the control oil chamber is applied in a direction opposite to the urging force of the urging member.

3. The parking brake device according to claim 1, wherein the maximum accumulation value of the accumulator is set to a value less than or equal to a pressure in the control oil chamber at the time at which the braking force starts increasing from when the parking brake device is switched from the non-braking state to the braking state.

4. The parking brake device according to claim 1, further comprising:
  a piston chamber defined in the discharge passage;
  a piston accommodated in the piston chamber, the piston dividing the piston chamber into a first oil chamber facing the control oil chamber and a second oil chamber facing the oil tank; and
  a piston passage located in the piston, the piston passage connecting the first oil chamber to the second oil chamber, and the discharged oil restrictor being located in the piston passage.

5. An industrial vehicle comprising a hydraulic parking brake device according to claim 1.

6. The parking brake device according to claim 1, further comprising a switching valve, which selects the braking state and the non-braking state of the parking brake device, wherein the switching valve is connected to the oil tank and the hydraulic pump, respectively,
  wherein part of the discharge passage and part of the supply passage forms a common supply/discharge passage, the discharged oil restrictor being located in the supply/discharge passage, the switching valve being connected to the control oil chamber via the common supply/discharge passage.

7. The parking brake device according to claim 6, further comprising:
  a supplied oil bypass passage, which is connected to the supply/discharge passage bypassing the discharged oil restrictor; and
  a supplied oil check valve located in the supplied oil bypass passage, wherein the supplied oil check valve permits flow of hydraulic oil from the switching valve to the control oil chamber.

8. A hydraulic parking brake device of a vehicle, wherein the device is selectively switched between a braking state and a non-braking state, the device comprising:
  a braking portion, which generates a braking force, the braking portion having a control oil chamber into which hydraulic oil flows, the braking force decreasing as the pressure in the control oil chamber increases and increasing as the pressure in the control oil chamber decreases;
  an oil tank;
  a hydraulic pump;
  a supply passage, which connects the hydraulic pump to the control oil chamber in the non-braking state;
  a discharge passage, which connects the control oil chamber to the oil tank in the braking state;
  a discharged oil restrictor located in the discharge passage;
  an accumulator connected to the control oil chamber, the accumulator being capable of releasing hydraulic oil to the control oil chamber when the braking force is greater than that at the time when the parking brake device is switched from the non-braking state to the braking state and the braking force can further be increased during the braking state of the parking brake device; and
  a switching valve, which selects the braking state and the non-braking state of the parking brake device, wherein the switching valve is connected to the oil tank and the hydraulic pump, respectively,
  wherein part of the discharge passage and part of the supply passage forms a common supply/discharge passage, the discharged oil restrictor being located in the supply/discharge passage, the switching valve being connected to the control oil chamber via the common supply/discharge passage.

9. The parking brake device according to claim 8, further comprising:

a supplied oil bypass passage, which is connected to the supply/discharge passage bypassing the discharged oil restrictor; and a supplied oil check valve located in the supplied oil bypass passage, wherein the supplied oil check valve permits flow of hydraulic oil from the switching valve to the control oil chamber.

10. The parking brake device according to claim 8, further comprising an urging member, which generates an urging force to increase the braking force, wherein force based on the pressure of the control oil chamber is applied in a direction opposite to the urging force of the urging member.

11. The parking brake device according to claim 8, wherein the maximum accumulation value of the accumulator is set to a value less than or equal to a pressure in the control oil chamber at the time at which the braking force starts increasing from when the parking brake device is switched from the non-braking state to the braking state.

12. A hydraulic parking brake device of a vehicle, wherein the device is selectively switched between a braking state and a non-braking state, the device comprising:

a braking portion, which generates a braking force, the braking portion having a control oil chamber into which hydraulic oil flows, the braking force decreasing as the pressure in the control oil chamber increases and increasing as the pressure in the control oil chamber decreases;

an oil tank;

a hydraulic pump;

a supply passage, which connects the hydraulic pump to the control oil chamber in the non-braking state;

a discharge passage, which connects the control oil chamber to the oil tank in the braking state;

a discharged oil restrictor located in the discharge passage;

an accumulator connected to the control oil chamber, the accumulator being capable of releasing hydraulic oil to the control oil chamber when the braking force is greater than that at the time when the parking brake device is switched from the non-braking state to the braking state and the braking force can further be increased during the braking state of the parking brake device;

a piston chamber defined in the discharge passage;

a piston accommodated in the piston chamber, the piston dividing the piston chamber into a first oil chamber facing the control oil chamber and a second oil chamber facing the oil tank; and a piston passage located in the piston, the piston passage connecting the first oil chamber to the second oil chamber, and the discharged oil restrictor being located in the piston passage.

13. The parking brake device according to claim 12, further comprising an urging member, which generates an urging force to increase the braking force, wherein force based on the pressure of the control oil chamber is applied in a direction opposite to the urging force of the urging member.

14. The parking brake device according to claim 12, wherein the maximum accumulation value of the accumulator is set to a value less than or equal to a pressure in the control oil chamber at the time at which the braking force starts increasing from when the parking brake device is switched from the non-braking state to the braking state.

* * * * *

UNITED STATES PATENT AND TRADEMARK OFFICE
CERTIFICATE OF CORRECTION

PATENT NO. : 7,273,136 B2 Page 1 of 1
APPLICATION NO. : 11/009332
DATED : September 25, 2007
INVENTOR(S) : Tetsuya Goto et al.

It is certified that error appears in the above-identified patent and that said Letters Patent is hereby corrected as shown below:

Column 1, line 45, please delete "between tow positions," and insert therefore
-- between two positions, --;

Column 5, line 21, please delete "passage 23 between to the" and insert therefore
-- passage 23 between the --;

Column 6, lines 10-11, please delete "restrictor 28 cooperates," and insert therefore
-- restrictor 28 cooperate, --; and Column 6, line 40, please delete "check valve 39. bypassing" and insert therefore
-- check valve 39, bypassing --.

Signed and Sealed this

Eighteenth Day of August, 2009

David J. Kappos
*Director of the United States Patent and Trademark Office*